(12) United States Patent　　(10) Patent No.: US 8,434,819 B2
Guerrero　　(45) Date of Patent: May 7, 2013

(54) OCCUPANT SAFETY SYSTEM

(75) Inventor: Michael D. Guerrero, Rochester, MI (US)

(73) Assignee: TK Holdings Inc., Auburn Hills, MI (US)

( * ) Notice: Subject to any disclaimer, the term of this patent is extended or adjusted under 35 U.S.C. 154(b) by 143 days.

(21) Appl. No.: 12/962,416

(22) Filed: Dec. 7, 2010

(65) Prior Publication Data

US 2011/0133529 A1　　Jun. 9, 2011

Related U.S. Application Data

(60) Provisional application No. 61/285,055, filed on Dec. 9, 2009.

(51) Int. Cl.
*B60N 2/42* (2006.01)
*B60N 2/427* (2006.01)
*B60R 21/013* (2006.01)
*B60R 21/0136* (2006.01)

(52) U.S. Cl.
USPC .............. 297/216.16; 297/216.1; 297/216.15

(58) Field of Classification Search ... 297/216.1–216.18
See application file for complete search history.

(56) References Cited

U.S. PATENT DOCUMENTS

| | | | | |
|---|---|---|---|---|
| 6,050,635 A | * | 4/2000 | Pajon et al. | 297/216.1 |
| 6,139,111 A | * | 10/2000 | Pywell et al. | 297/216.13 X |
| 6,227,563 B1 | * | 5/2001 | Talisman | 297/216.15 X |
| 6,386,631 B1 | * | 5/2002 | Masuda et al. | 297/216.1 |
| 6,398,285 B2 | * | 6/2002 | Motozawa et al. | 297/216.15 X |
| 6,422,632 B1 | * | 7/2002 | Kamei et al. | 297/216.16 X |
| 6,435,591 B1 | * | 8/2002 | Nilsson | 297/216.15 X |
| 6,435,592 B2 | * | 8/2002 | Nilsson | 297/216.15 X |
| 6,454,351 B2 | * | 9/2002 | Motozawa et al. | 297/216.16 |
| 6,746,077 B2 | * | 6/2004 | Klukowski | 297/216.1 |
| 6,824,187 B2 | * | 11/2004 | Motozawa et al. | 297/216.16 X |
| 6,851,505 B2 | * | 2/2005 | Motozawa et al. | 297/216.15 X |
| 7,172,218 B2 | * | 2/2007 | Nakano et al. | 280/806 |
| 7,229,133 B2 | * | 6/2007 | Maddelein et al. | 297/216.15 X |
| 7,380,832 B2 | * | 6/2008 | Gray et al. | 280/806 |
| 8,109,568 B2 | * | 2/2012 | Masutani | 297/216.15 |
| 2002/0003365 A1 | * | 1/2002 | Yamaguchi et al. | 297/216.1 |
| 2004/0051353 A1 | * | 3/2004 | Klukowski | 297/216.1 |
| 2006/0001298 A1 | * | 1/2006 | Tsuruta et al. | 297/216.16 |
| 2008/0258521 A1 | * | 10/2008 | Gumprecht et al. | 297/216.15 |
| 2009/0072596 A1 | * | 3/2009 | Rogers | 297/216.17 |
| 2010/0164261 A1 | * | 7/2010 | Wich et al. | 297/216.1 X |
| 2011/0210586 A1 | * | 9/2011 | Masutani | 297/216.1 |

* cited by examiner

*Primary Examiner* — Rodney B White
(74) *Attorney, Agent, or Firm* — Foley & Lardner LLP

(57) ABSTRACT

An occupant safety system for protecting the occupant of a vehicle seat, the system comprising a movable seat supporting member located under the vehicle seat, the supporting member being operatively connected to the vehicle seat so that the seat moves with the supporting member; and a driving member connected to the supporting member by an elongated linking member; wherein the driving member includes a movable actuator connected to the linking member; wherein the driving member is configured to drive the actuator in a rearward direction causing a corresponding rearward movement of the linking member, wherein movement of the linking member in the rearward direction pulls the supporting member and the vehicle seat in the rearward direction.

20 Claims, 5 Drawing Sheets

OCCUPANT SAFETY SYSTEM

CROSS-REFERENCE TO RELATED PATENT APPLICATIONS

This application claims priority from U.S. Provisional Patent Application No. 61/285,055, filed on Dec. 9, 2009. The foregoing provisional application is incorporated by reference herein in its entirety.

BACKGROUND

The present application relates generally to the field of safety systems to protect occupants of motor vehicles. More specifically, this application relates to an occupant safety system for displacing a seat system and the seated occupant to provide improved protection by increasing the clearance between the occupant and forward positioned vehicle components, such as a dashboard or instrument panel.

Vehicle safety standards are periodically changed to encourage vehicle manufacturers to incorporate innovative features to reduce injuries caused by vehicle accidents. Occupant injuries may occur from frontal vehicle collisions with relative small cross-sectional fixed objects, such as telephone poles or trees, whereby the fixed object often will substantially deform the location of impact causing the engine to displace in the rearward direction towards the passenger compartment. The engine may be displaced far enough to intrude into the firewall, driving the dashboard or the instrument panel in the rearward direction towards the occupant in the vehicle passenger compartment. This dashboard (or instrument panel) intrusion may cause injuries to occupants, and specifically to the lower limb (i.e., the portion of a human from the hip to the foot).

One solution to reduce occupant injury resulting from the dashboard or instrument panel intrusion, during such vehicle collisions, is to reduce the deformation of the vehicle local to the impact to reduce the rearward displacement of the engine, which causes the front of the dashboard and instrument panel to move in the direction of the occupant. One method to reduce deformation of the vehicle local to impact is to increase the stiffness of the vehicle, such as the frame and the structure supporting the engine. One problem with increasing vehicle stiffness is there is a corresponding decrease in the ability of the vehicle to absorb impact energy, which has a negative impact on occupant safety. As the ability of the vehicle to absorb impact energy decreases, then this energy transfers through the vehicle and to the occupant, increasing the forces required to restrain the occupant. Also, increasing vehicle stiffness may increase vehicle mass, which could reduce fuel economy and vehicle efficiency.

It would be advantageous to reduce vehicle occupant injuries caused by rearward displacements of vehicle components (e.g., dashboards and instrument panels), while having a minimal impact on the overall mass and optimal stiffness of the vehicle to avoid compromising vehicle crash-worthiness.

SUMMARY

One embodiment of the invention relates to an occupant safety system for protecting the occupant of a vehicle seat, the system comprising a movable seat supporting member located under the vehicle seat, the supporting member being operatively connected to the vehicle seat so that the seat moves with the supporting member; and a driving member connected to the supporting member by an elongated linking member; wherein the driving member includes a movable actuator connected to the linking member; wherein the driving member is configured to drive the actuator in a rearward direction causing a corresponding rearward movement of the linking member, wherein movement of the linking member in the rearward direction pulls the supporting member and the vehicle seat in the rearward direction.

Another embodiment of the invention relates to a vehicle seating system comprising a vehicle seat including a seat bottom and a seat back; a movable seat supporting member connected to the seat bottom so that the vehicle seat moves with the supporting member; and a driving member connected to the supporting member by an elongated linking member; wherein the driving member includes a movable actuator connected to the linking member; wherein the driving member is configured to drive the actuator in a rearward direction causing a corresponding rearward movement of the linking member, wherein movement of the linking member in the rearward direction pulls the supporting member and vehicle seat in the rearward direction. The vehicle seating system may further comprise a seat belt webbing for restraining an occupant of the seat, wherein the driving member is configured to pretension the webbing. The vehicle seating system may further comprise a second linking member operatively connected to the actuator and the webbing.

Another embodiment of the invention relates to a vehicle seating system comprising a vehicle seat including a seat bottom and a seat back; an adjuster mechanism coupled to the seat bottom for providing positional adjustment of the vehicle seat; a movable seat supporting member connected to the adjuster mechanism so that the vehicle seat moves with the supporting member; and a driving member connected to the supporting member by an elongated linking member; wherein the driving member includes a movable actuator connected to the linking member; wherein the driving member is configured to drive the actuator in a rearward direction causing a corresponding rearward movement of the linking member, wherein movement of the linking member in the rearward direction pulls the supporting member and vehicle seat in the rearward direction. The vehicle seating system may further comprise a seat belt webbing for restraining an occupant of the seat, wherein the driving member is configured to pretension the webbing. The vehicle seating system may further comprise a second linking member operatively connected to the actuator and the webbing.

DETAILED DESCRIPTION

With reference generally to the FIGURES, disclosed are occupant safety mechanisms configured to improve occupant protection by displacing, prior to or during a vehicle impact, the seat assembly and the seated occupant rearward to increase the distance between the occupant, such as the lower limb of the occupant, and the dashboard or instrument panel. The occupant safety mechanism may be configured to lock the seat assembly in this rearward displaced position during and after vehicle impact. By increasing the clearance between the occupant and the forward positioned dashboard, injury to the occupant, such as the lower limb, caused by intrusion of the dashboard may be eliminated or reduced.

Figure 1:
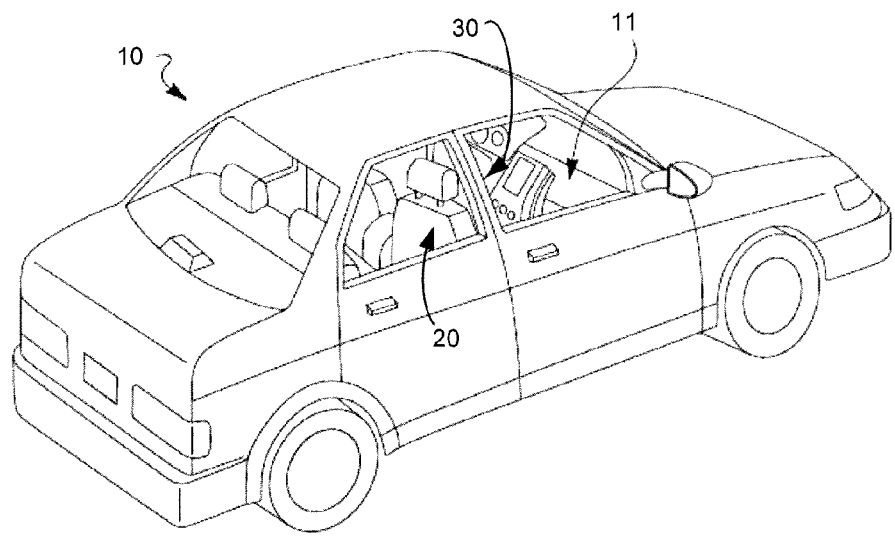
FIG. 1 is a perspective view of an exemplary embodiment of a motor vehicle.

With reference to FIG. 1, an exemplary embodiment of a motor vehicle 10 is illustrated and includes a passenger compartment 11, which may include a seat system 20 to provide seating to a vehicle occupant (not shown). The passenger compartment 11 further includes an occupant safety system 30. The occupant safety system 30 may include a safety mechanism or device configured to provide occupant protection by displacing the seat system 20 (and hence the seat occupant) rearward prior to and/or during rapid deceleration of the vehicle, such as a dynamic vehicle event. The occupant safety mechanisms disclosed herein can be included within any motor vehicle (e.g., passenger car, military vehicles, mass-transit vehicles) and may be used to protect any occupant (e.g., driver, front passenger, rear passenger) and the illustrations herein are not meant as limitations.

Figure 2:
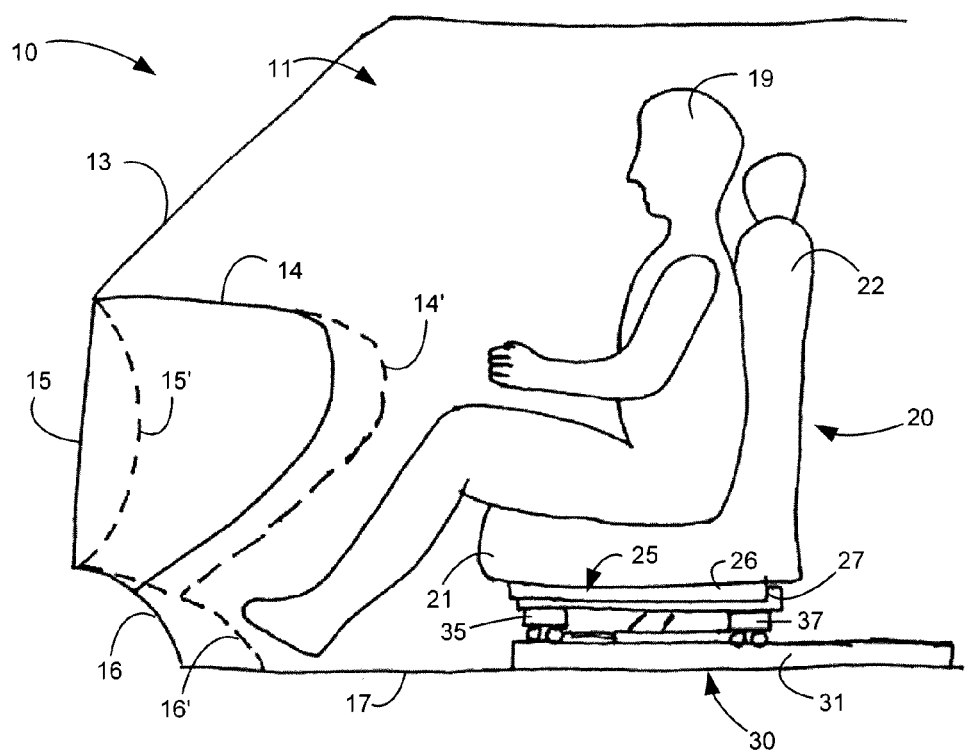
FIG. 2 is a cross-sectional view of a forward passenger compartment of a motor vehicle illustrating the intrusion of the dashboard towards the occupant during a frontal impact.

With reference to FIG. 2, an exemplary embodiment of the passenger compartment 11 of the motor vehicle 10 is illustrated, and includes a seat system 20, an occupant 19 seated in the seat system 20, and an occupant safety system 30. The motor vehicle 10 includes a windshield 13, a dashboard 14 provided below the windshield 13, a firewall 15 provided between the engine compartment (not shown) and the dashboard 14, a foot-well 16 provided below the dashboard 14, and a floor pan 17 provided below the foot-well 16. The floor pan 17 extends the length of the passenger compartment 11. Also shown as dashed lines are the approximate location of the dashboard intrusion 14', the firewall intrusion 15', and the foot-well intrusion 16', which represent an approximate distance of intrusion by the respective member during a frontal impact of vehicle 10. For example, when the vehicle 10 frontally impacts a barrier, such as a tree, the engine (not shown) having a relative high stiffness (or strength) will be displaced from the forces of impact rearward toward the passenger compartment, which will impart forces on the relative lower stiffness (or strength) of the firewall 15, the dashboard 14, and the foot-well 16, displacing the firewall 15, the dashboard 14, and the foot-well 16 rearward toward the occupant 19.

According to an exemplary embodiment, an occupant safety system 30 is provided below the seat system 20 and couples the seat system 20 to the floor pan 17 of the vehicle 10 through the occupant safety system 30. The seat system 20 is configured to provide seating to an occupant 19. According to an exemplary embodiment, the seat system 20 includes a seat back 22 having a structural member and a padded member, and a seat bottom (or cushion) 21 having a structural member and a padded member.

The seat system 20 may further include a seat adjuster or adjuster mechanism 25 to provide comfort adjustment of the seat assembly through conventional means (e.g., 2-way adjustment, 8-way adjustment, etc.). According to an exemplary embodiment, the adjuster mechanism 25 includes an upper slide rail 26 and a lower slide rail 27 configured to translate relative to the upper rail 26. The relative translation (or displacement) between the upper and lower rails 26, 27 may be achieved by any now known or future developed methods.

The upper slide rail 26 may be coupled to the seat system 20 to provide comfort adjustment of the seat system 20 upon translation relative to the lower slide rail 27 (and hence relative to the vehicle 10). According to an exemplary embodiment, the upper slide rail 26 is connected to the seat bottom 21 of seat system 20. According to an exemplary embodiment, the lower slide rail 27 is connected to the occupant safety mechanism 30, which may also be coupled to the floor pan 17 of the vehicle 10. The lower slide rail 27 (and hence the seat system 20) translate in substantially the fore-aft direction relative to the floor pan 17 of the vehicle 10 when the occupant safety mechanism 30 is triggered (or actuated or deployed). Thus, the occupant 19 is able to adjust the seat system 20 for comfort through the adjuster mechanism 25 without impeding or affecting the operation of the occupant safety mechanism 30 when actuated.

According to another exemplary embodiment, the occupant safety mechanism 30 may be configured to connect directly to the seat bottom 21 of the seat system 20. The occupant safety mechanism 30 may further couple to the floor pan 17 of the vehicle 10 to allow the seat assembly to translate in substantially the fore-aft direction relative to the floor pan 17 of the vehicle 10 when the occupant safety mechanism 30 is triggered (or actuated or deployed). According to another exemplary embodiment, the seat system may include an intervening member (e.g., structural member, folding mechanism, etc.) provided between the seat bottom and the occupant safety mechanism. The intervening member may be configured to move with the moveable seat supporting member and the seat system during actuation of the occupant safety mechanism.

The occupant safety mechanisms as disclosed herein may be configured with the seat system having any adjuster mechanism operated by any method (e.g., manually operated, power operated). Furthermore, the occupant safety mechanisms as disclosed herein may be integrally coupled with any adjuster mechanism to provide both occupant selectable adjustment to provide improved comfort and safety adjustment to provide improved occupant safety, during triggering events, by moving the seat assembly and seated occupant rearward away from the dashboard.

Upon actuation, the occupant safety mechanism 30 translates the seat system 20 and the seated occupant 19 being restrained by the seatbelt system of the seat substantially rearward away from the dashboard 17 to increase the clearance between the dashboard 17 and the occupant 19 in order to bring the lower limb and thorax of the occupant 19 clear of floor pan intrusion 16' and dashboard intrusion 14'. The occupant safety mechanism 30 may include a travel stop to limit the rearward travel of the seat system 20. The occupant safety mechanism 30 may further include a lock device configured to lock the seat system 20 after a predetermined rearward displacement to prohibit the seat system 20 (and restrained occupant 19) from sliding back in the forward direction toward the dashboard 14 from the deceleration of the vehicle 10. The lock device of the occupant safety mechanism 30 is configured to manage (or withstand) the forces imparted into the occupant safety system 30 induced by the seat system 20 (e.g., the seat belt system of the seat) restraining the occupant 19.

The vehicle 10 further includes an active occupant restraint system (not shown), such as a seatbelt assembly, to provide active restraint to the occupant 19. According to an exemplary embodiment, a seat system 20 further includes an integrated seatbelt assembly (not shown) having a webbing connected at a first end to an anchor member connected to the seat assembly and connected at s second end to a retractor mechanism connected to the seat assembly, a buckle mechanism connected to the seat assembly, and a tongue member slideably coupled to the webbing and configured to selectively couple to the buckle mechanism. The seatbelt assembly may further include a tensioning device (e.g., a pretensioner) configured to provide tension on the webbing to remove slack between the webbing and the restrained occupant during a sudden deceleration of the vehicle to improve occupant restraint. It should be noted that the seatbelt assembly may be configured using any known or future developed method. For example, the seatbelt assembly may include anchor positions (e.g., retractor, anchor member, and/or buckle mechanism) that couple to other components of the vehicle, such as to the floor pan.

Whether the seat belt assembly is coupled to the seat assembly or to the vehicle can impact the process or timing of operations providing occupant safety, which the occupant safety mechanism may be tailored to satisfy. For example, a seat assembly having the seat belt assembly coupled directly to the seat permits the seat belt assembly to translate with the seat assembly, when the occupant safety mechanism is triggered. Thus, if the seat belt assembly includes pretensioners (e.g., retractor pretensioner, buckle pretensioner), then the timing of the safety operations may include the pretensioners firing before the occupant safety mechanism is triggered. This allows the pretensioners to remove clearance between the seat belt and the seated occupant prior to the seat assembly translating rearward relative to the vehicle, so that the occupant may be optimally restrained during seat translation.

Another example includes the seat belt anchor positions being coupled to the vehicle, wherein the anchor positions of the seat belt assembly may remain substantially fixed while the seat assembly translates rearward when the occupant safety mechanism is triggered. Thus, if the seat includes pretensioners, then the timing of the safety operations may include the occupant safety mechanisms triggering first or substantially simultaneous to the pretensioners. This allows the seat to move into position prior to removing the clearance between the seat belt and occupant, or to remove the clearance substantially simultaneous to the translation of the seat.

Figure 3:
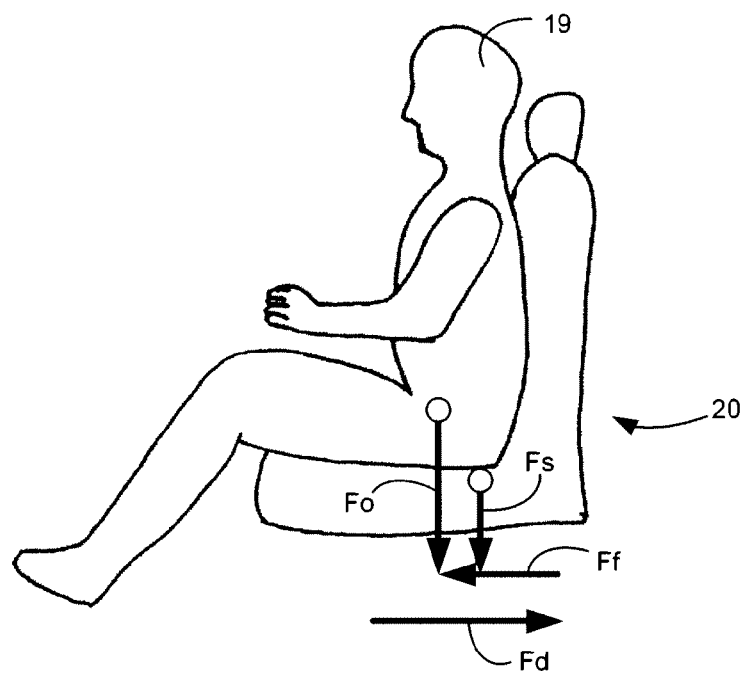
FIG. 3 is a side view of a seat assembly and a seated occupant illustrating the force required to displace the substantially static occupant and seat assembly rearward relative to the vehicle.
Figure 4:
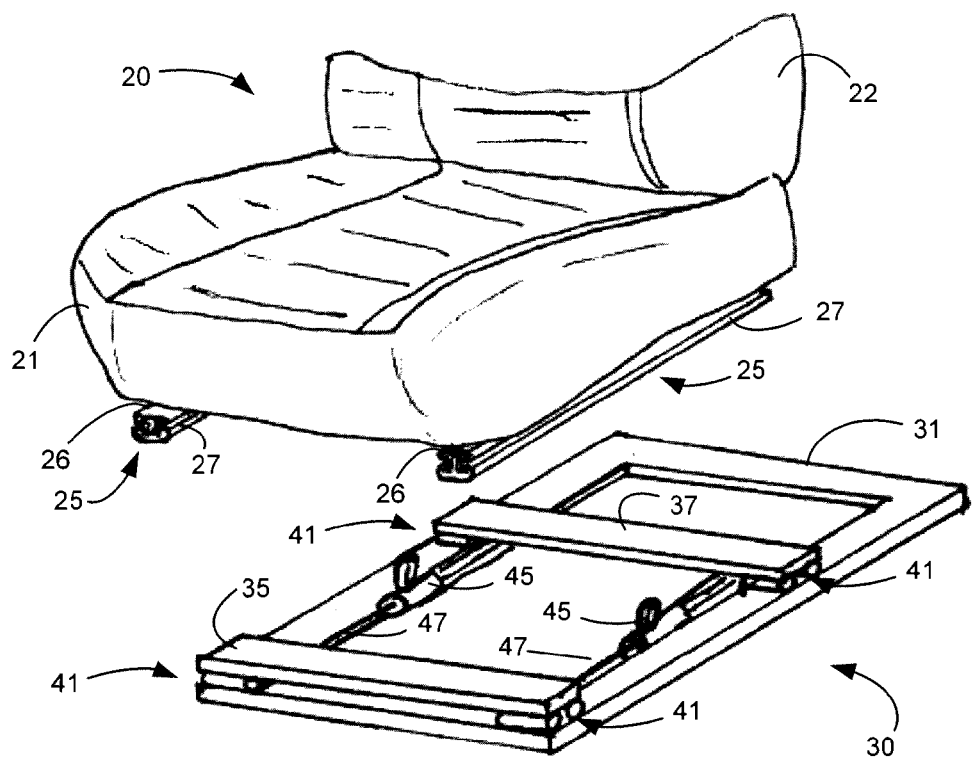
FIG. 4 is a partially exploded perspective view of an exemplary embodiment of an occupant safety mechanism separated from a seat assembly.
Figure 5:
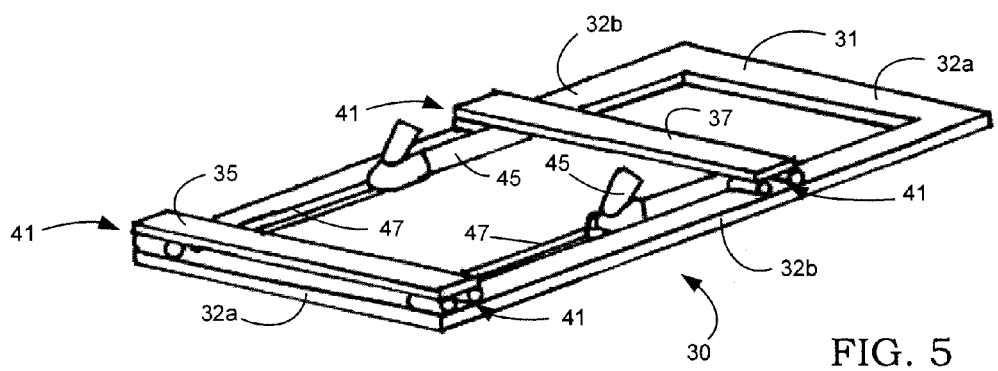
FIG. 5 is a perspective view of the occupant safety mechanism of FIG. 4.
Figure 6:
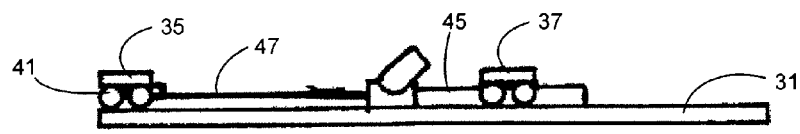
FIG. 6 is a side view of the occupant safety mechanism of FIG. 5.
Figure 7:
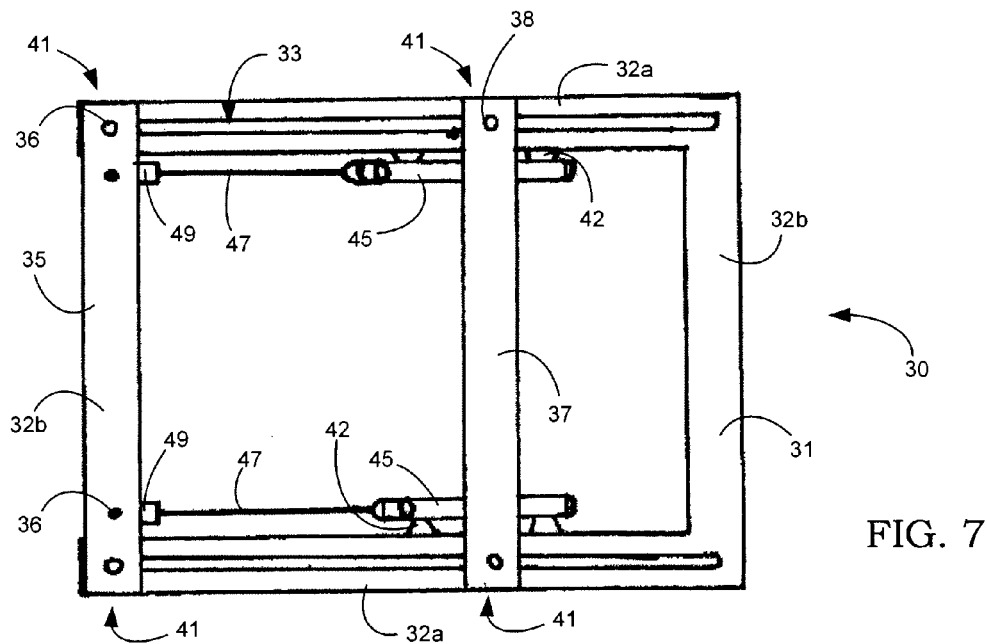
FIG. 7 is a top view of the occupant safety mechanism of FIG. 5.
Figure 8:
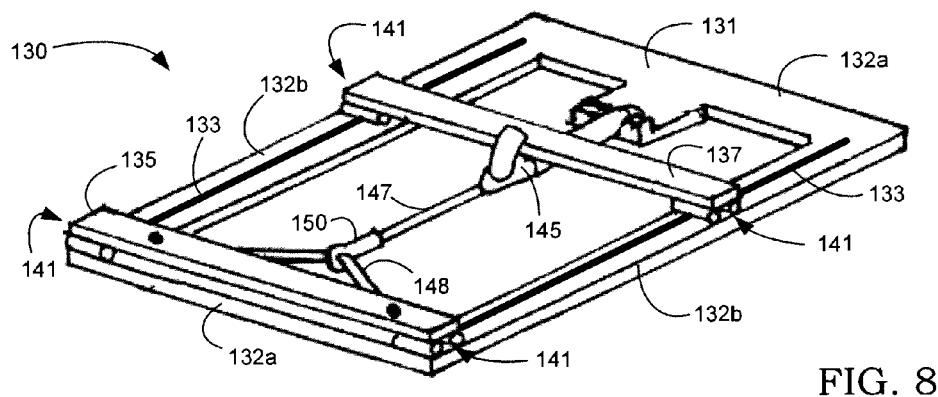
FIG. 8 is a perspective view of another exemplary embodiment of an occupant safety mechanism.
Figure 9:
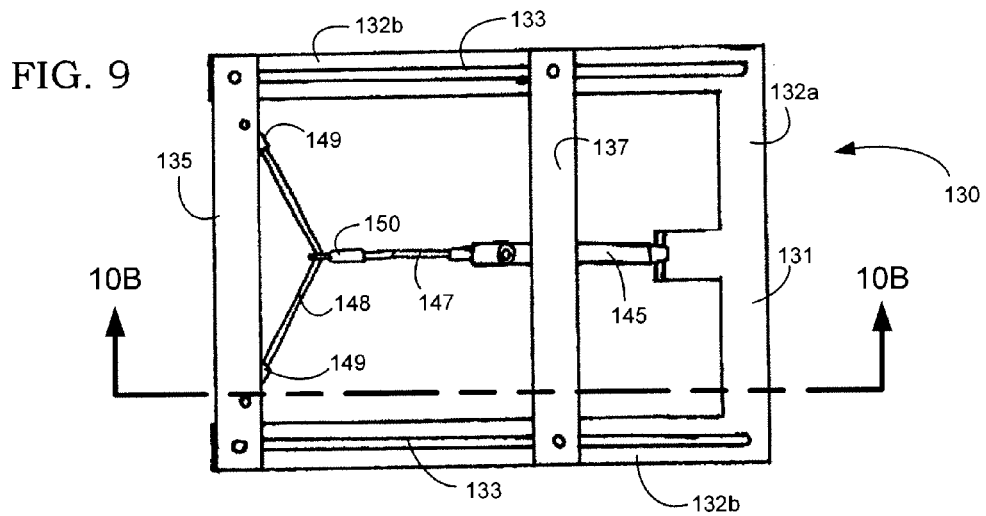
FIG. 9 is a top view of the occupant safety mechanism of FIG. 8.
Figure 10A:
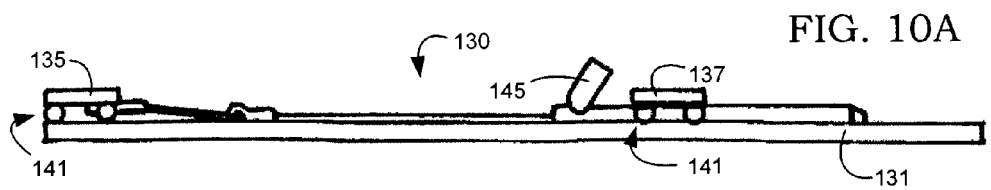
FIG. 10A is a side view of the occupant safety mechanism of FIG. 8.
Figure 10B:
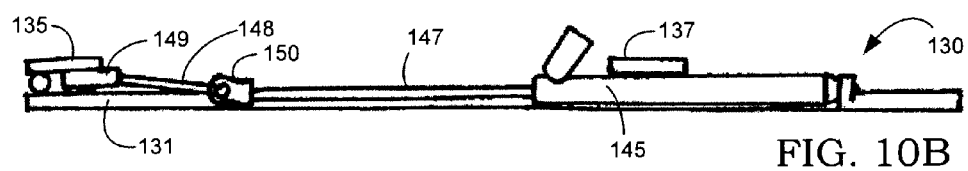
FIG. 10B is a side cross-sectional view of the occupant safety mechanism of FIG. 8.
Figure 11:
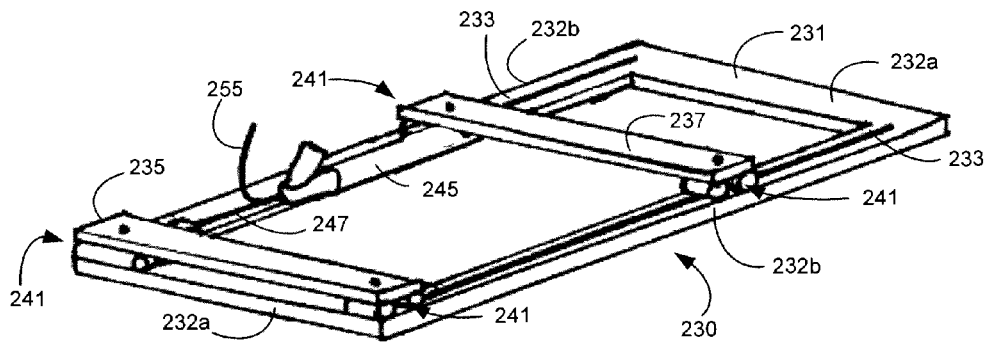
FIG. 11 is a perspective view of yet another exemplary embodiment of an occupant safety mechanism.
Figure 12:
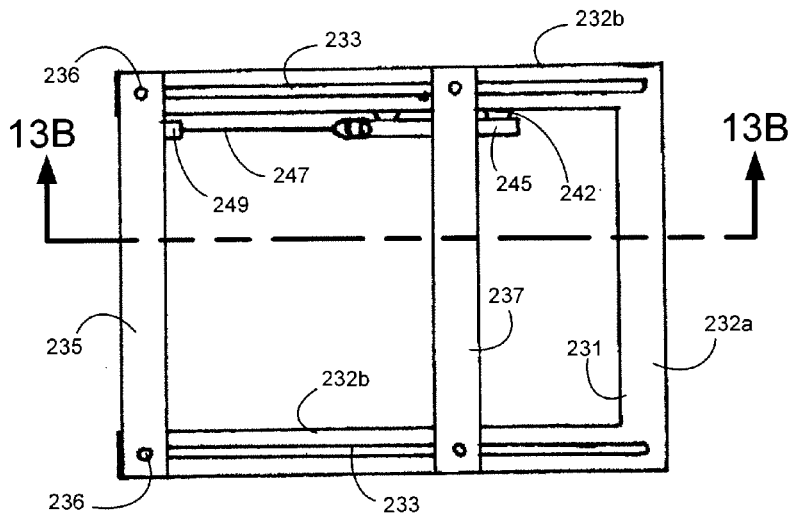
FIG. 12 is a top view of the occupant safety mechanism of FIG. 11.
Figure 13A:
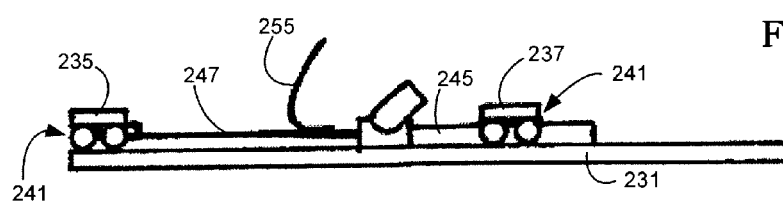
FIG. 13A is a side view of the occupant safety mechanism of FIG. 11.
Figure 13B:
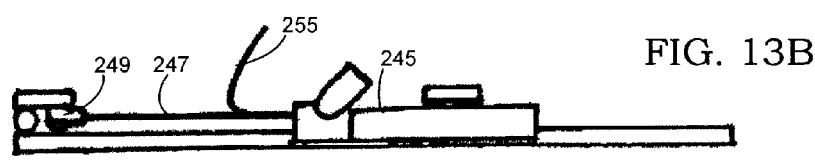
FIG. 13B is a side cross-sectional view of the occupant safety mechanism of FIG. 11.

With reference to FIG. 3, a free body diagram illustrates the required force $F_d$ to move a static occupant 19 and a static seat system 20 rearward. The force $F_d$ must overcome the static friction force $F_f$ from the force $F_o$ and the force $F_s$ where the force $F_o$ represents the mass of the occupant accelerated by gravity and the force $F_s$ represents the mass of the seat system accelerated by gravity. Thus, the friction force $F_f$ is the sum of the force $F_s$ and force $F_o$ multiplied by the static coefficient of friction $\mu_s$. Thus, $F_f = [(F_o + F_s) \times \mu_s]$. According to an exemplary embodiment, the mass for a 50% male seat occupant is about 76 kg, producing a force $F_o$ of about 746 N. According to an exemplary embodiment, the mass of a typical front row seat system is about 22 kg, producing a force $F_s$ of about 216 N. These forces sum to about 962 N, so using a static coefficient of friction of about 0.8, the resulting force $F_d$ is about 770 N, which represents the approximate force required to move a static seat system weighing about 22 kg with an occupant weighing about 76 kg seated in the seat system. This force is well within the range of current safety devices, such as pyrotechnic buckle pretensioners.

The occupant safety mechanism may be configured to communicate with a control module in the vehicle, which may trigger the occupant safety mechanism based on vehicle parameters. The control module may communicate with a pre-crash detection system, which includes a plurality of sensors (e.g., vision, radar, velocity, acceleration) for detecting and monitoring various vehicle parameters (e.g., vehicle speed, vehicle proximity to another object, etc.). The control module may evaluate information provided by the plurality of sensors, whereby a determination may be made that a vehicle crash is imminent, which would trigger activation of the occupant safety mechanism. This system allows activation of the occupant safety mechanism prior to impact of the vehicle, after which deceleration of the vehicle would require an increased force to translate the seat system and occupant rearward. The occupant safety system may include a seatbelt assembly, such as discussed herein, that is used in conjunction with the safety mechanism.

According to an exemplary embodiment, the occupant safety mechanism may configured with a memory means, which may return the seat assembly to its position pre-activation by the control module, in the event that a vehicle impact did not occur. Thus, if the control module or pre-crash detection system were to trigger the occupant safety mechanism to deploy rearward because a crash was considered imminent, but the vehicle did not impact anything, then the occupant safety mechanism could move the seat assembly forward to the seated position pre-deployment.

According to another exemplary embodiment, an occupant safety mechanism may be configured to be activated after impact of the vehicle with another object or obstacle. The occupant safety mechanism may be connected to a control module, which may communicate with sensors that determine when the vehicle impacts an object. The occupant safety mechanism may be configured to provide a relative increased force to translate the seat assembly during the vehicle impact, then lock the seat assembly in a rearward position. The occupant safety mechanisms as disclosed herein may be configured to communicate with occupant detection devices, so that the occupant safety mechanisms will only trigger when the seat is occupied. This can also allow the occupant safety mechanism to tailor the force to translate the seat rearward based on the mass of the occupant seated.

With reference to FIGS. 4-7, an exemplary embodiment of an occupant safety mechanism 30 is shown separated from a seat system 20, such as prior to coupling, for clarity. According to an exemplary embodiment, the occupant safety mechanism 30 includes a base member 31, a first moveable seat supporting member (or sliding rail) 35, a second moveable seat supporting member (or sliding rail) 37, a plurality of driving members 45, a plurality of elongated linking members (or moving member) 47, a plurality of coupling members 49, and a plurality of friction reducing devices 41.

The base member 31 is configured to couple to the floor pan 17 of the vehicle 11 using any suitable method and to transfer loading from the seat system 20 to the floor pan 17. According to an exemplary embodiment, the base member 31 includes a first horizontal member 32a, a second horizontal member 32a, and two side members 32b that are coupled together using any suitable mean (e.g., fasteners, welds). According to another exemplary embodiment, the two horizontal members 32a and the two side members 32b are integrally formed (e.g., a single stamping). The base member 31 may be made from steel or any suitable material strong enough to withstand the loads transferred during a dynamic vehicle event. The base member 31 may further provide attachment means for coupling of the moveable seat supporting members and/or the friction reducing devices 41.

The moveable seat supporting members 35, 37 may be made from steel or any suitable material that is strong enough to withstand the loads transferred during a dynamic vehicle event. According to an exemplary embodiment, the moveable seat supporting members 35, 37 are connected to the lower rail 27 of the adjuster mechanism 25 of the seat system 20 using any suitable method. According to another exemplary embodiment, the moveable seat supporting members 35, 37 are directly connected to the seat bottom 21 of the seat system 20. The moveable seat supporting members 35, 37 may be configured to slideably couple to the base member 31 so that the moveable seat supporting members 35, 37 may translate relative to the base member 31, when driven by the driving members 45 through the elongated linking members 47 and the coupling members 49. For example, each side member 32a of the base member 31 may include with a slot 33 configured to receive a stud to couple to one of the moveable seat supporting members 35, 37 to permit the seat supporting members to translate along the longitudinal direction of the side members 32a (i.e., substantially the fore-aft direction of the vehicle).

According to an exemplary embodiment, the first moveable seat supporting member 35 includes an aperture 36 configured to receive a stud (or fastener) that also engages the slot 33 in the side member 32a to slideably couple the first moveable seat supporting member 35 to the side member 32a of the base member 31. The second moveable seat supporting member 37 may include an aperture 38 configured to receive a fastener or stud to slideably couple the second moveable seat supporting member 37 to the side member 32a of the base member 31 through the slot 33. This configuration withstands loading, such as peel loads, that may be imparted by a torque about a cross-car axis, which are indicative of occupant loading through the seat assembly induced by a forward vehicle impact.

According to an exemplary embodiment, provided between the moveable seat supporting members 35, 37 and the base member 31 are a plurality of friction reducing devices 41, which are configured to reduce the friction between the moveable seat supporting members 35, 37 and the base member 31 to reduce the force required to translate the seat supporting members relative to the base. The friction reducing devices may be configured as bearings, bushings, or any known or future developed device to reduce friction and allow relative translation between two adjacent members.

The driving member 45 provides the force that induces relative motion between the moveable seat supporting members 35, 37 and the base member 31 of the occupant safety system 30. According to an exemplary embodiment, the driving member 45 is configured to include a pyrotechnic device, such as a conventional buckle (or webbing) pretensioner, in which the pyrotechnic provides almost instantaneous energy. The pretensioning devices disclosed in U.S. Pat. No. 7,172,218 to Nakano et al. provide exemplary embodiments of the driving members that may be used within the occupant safety mechanisms disclosed herein. The foregoing U.S. patent is incorporated by reference herein in its entirety. Additionally, the pretensioning devices disclosed in U.S. Pat. No. 7,380,832 to Gray et al. provide other exemplary embodiments of the driving members that may be used within the occupant safety systems disclosed herein, and is incorporated by reference herein in its entirety.

According to an exemplary embodiment, the housing of the driving member 45 is connected directly to the base member 31 to maintain the position of the housing of the driving member 45 during actuation. According to another exemplary embodiment, the housing of the driving member 45 is coupled to an attachment member 42 that is connected to the base member 31.

According to an exemplary embodiment, the driving member 45 includes a elongated linking member 47 configured to move or translate in a substantially linear direction when the driving member 45, such as the pyrotechnic device, fires or actuates. The elongated linking member 47 is configured to translate relative to the housing of the driving member 45. According to an exemplary embodiment, the elongated linking member 47 is a cable having a first end connected to an actuator within a chamber of the driving member 45 and a second end that is connected to a coupling member 49, which is coupled to the first moveable seat supporting member 35. According to another exemplary embodiment, the second end of the elongated linking member 47 directly couples to the first moveable seat supporting member 35.

When the driving member is activated (e.g., when the pretensioner fires), the actuator translates in the rearward direction relative to the housing of the driving member, thereby driving the first seat supporting member connected to the actuator to translate relative to the base member of the occupant safety mechanism. According to an exemplary embodiment, the pyrotechnic device within the driving member 45 generates gas to increase the pressure within the chamber of the driving member 45 to move the actuator and the elongated linking member 47 coupled to the actuator along the length of the chamber of the driving member 45 in a substantially rearward vehicle direction. Thus, the driving member 45 may be aligned so that the displacement of the actuator pulls a portion of the linking member into the driving member, thereby pulling the first moveable seat supporting member 35 in the rearward direction relative to the vehicle.

According to other exemplary embodiments, the driving members may be mechanical, electrical, or hydraulic in nature to provide the translation of the moving member. For example, the driving device may be a solenoid, which turns electric current into linear motion. The driving member may include a magneto-rheological fluid, which allows the force of translation to be controlled by an electromagnet. The driving member may be tailored to move the moveable seat supporting members with a predetermined force, over a predetermined distance and in a predetermined time. The driving members disclosed herein are not meant to be limitations and the driving members may be configured using any method of translating a first portion of the member relative to a second portion.

During an event that triggers the occupant safety mechanism 30, one or both driving members 45 will activate or fire, which moves the first moveable seat supporting member 35 in a substantially linear rearward direction relative to the base, which may be fixed to the floor plan. The occupant safety mechanism 30 may be configured to translate a predetermined distance, such as the maximum rearward travel allowed by the travel stop, and may further be configured to lock in the rearward travel position by the lock device. For example, the driving member may include internally the lock device to retain the moveable seat supporting member at the rearward travel position. The seat system 20 being configured to move with the forward moveable seat supporting member 35 is pulled rearward with the seat supporting member relative to the base. The seated occupant being restrained to the seat by the seat belt assembly is also driven rearward with the seat system relative to the dashboard, creating an increased gap between the occupant and dashboard to provide improved occupant safety by reducing the likelihood and amount of injury (e.g., lower limb injury) caused by dashboard intrusion.

With reference to FIGS. 8-10B, another exemplary embodiment of an occupant safety mechanism 130 is illustrated and includes a base member 131 having two horizontal members 132a and two side members 132b, a first moveable seat support member (or sliding rail) 135, a second moveable seat support member 137, a driving member 145, an elongated linking member 147, a V-shaped linking member 148, a first coupling member 149, a second coupling member 150, and a plurality of friction reducing devices 141. The driving member 145 is connected to the base member 131 and to the elongated linking member 147, which is coupled to the second coupling member 150. The second coupling member 150 is further coupled to the V-shaped linking member 148. The V-shaped linking member 148 may couple directly (or through the first coupling member 149) to the first moveable seat support member 135.

The moveable seat support members 135, 137 are configured to slide relative to the base member 131, and may be slideably coupled to the base member 131 through the slot 133. When the occupant safety mechanism 130 is triggered, the driving member 145 will activate and move the first moveable seat support member 135 in a substantially linear rearward direction relative to the base, which in turn moves the seat system and seated occupant with the first moveable seat support member 135. The occupant safety mechanism 130 may lock in a rearward translated position, prohibiting further translation of the occupant safety mechanism and hence the coupled seat. The seated occupant being restrained to the seat assembly is also driven rearward relative to the dashboard, increasing the gap between the occupant and dashboard to provide improved occupant safety by reducing the likelihood and amount of injury (e.g., lower limb injury) caused by dashboard intrusion.

With reference to FIGS. 11-13B, another exemplary embodiment of an occupant safety mechanism 230 is illustrated and includes a base member 231 having two horizontal members 232a and two side members 232b, a first moveable seat support member 235, a second moveable seat support member 237, a driving member 245, an elongated linking member 247, a coupling member 249, a second elongated linking member 255, and a plurality of friction reducing devices 241. The driving member 245 is connected to the base member 231. The first elongated linking member 247 is connected to an actuator within the driving member 245 and to the coupling member 249. The coupling member 249 is further coupled to the first moveable seat support member 235.

The second elongated linking member 255 includes a first end connected to the actuator of the driving member 245, and a second end connected to the seatbelt assembly. According to an exemplary embodiment, the second end of the second elongated linking member 255 is connected to the webbing of the seatbelt assembly. According to other exemplary embodiments, the second end of the second elongated linking member 255 is connected to anchor member, the buckle mechanism, or any other component of the seatbelt assembly. The second elongated linking member 255 is configured to pretension the webbing of the seatbelt assembly.

When the occupant safety mechanism 230 is triggered, the driving member 245 will activate and move the actuator of the driving member 245 in a substantially linear rearward direction relative to the base member 231 pulling the first and second elongated linking members 247, 255 in the rearward direction as well. The first elongated linking member 247 pulls the first moveable seat support member 235 and the connected seat assembly with the occupant in the rearward direction. The second elongated linking member 255 pulls the webbing of the seatbelt assembly providing pretension to remove the slack between the webbing and the occupant being restrained by the seatbelt webbing and assembly. The occupant safety mechanism 230 may further include a travel stop and/or lock device, such as, for example, configured with the driving member 245.

It should be noted that the occupant safety mechanism 230 may be configured with a plurality of driving members 245 and a plurality of elongated linking members 255, whereby upon actuation of the occupant safety mechanism 230 each of the plurality of linking members 255 provide pretensioning, such as, to the webbing of the seat belt system. For example, upon actuation of the driving members 245 the occupant protection system 230 may provide pretensioning to the webbing through both the buckle mechanism and the anchor member, each being connected to one of the plurality of linking members 255.

As illustrated, the occupant safety mechanisms may include one or more than one driving member, which may be located in the central portion of the seat, toward the outer portion of the seat, or anywhere with in the seat system. Additionally, a driving member configured in the central portion of the seat may be configured to pull a plurality of elongated linking members, whereby at least one elongated linking member is connected to the first moveable seat support member and at least one elongated linking member is connected to the seatbelt assembly to provide pretension to the webbing of the seatbelt assembly.

The occupant safety mechanisms disclosed herein are configured to improve occupant safety by reducing or eliminating occupant injuries, such as lower limb injuries, resulting from vehicle impacts with objects, such as small trees or telephone poles, by moving the seat and the seated occupant in a rearward direction away from forward positioned vehicle components, such as the dashboard or instrument panel, which may deform into the occupant. The occupant safety mechanisms may be configured to translate the seat and seated occupant prior to, during, or immediately following a vehicle impact. The occupant safety mechanisms may be configured to lock the seat in the rearward translated position prior to, during, or immediately following a vehicle impact. The occupant safety mechanisms may be configured with a driving member configured to include any pyrotechnic, mechanical, electrical, hydraulic, or any suitable means for translating a first portion of the driving device relative to a second portion of the driving device.

Additionally, occupant safety mechanisms that are configured to pull the moveable seat supporting member rearward (along with the seat) allow for the elongated linking member that pulls seat supporting member to be preferably configured as a cable. A cable is relatively low cost and allows for the use of known pretensioners to be utilized as the driving members. If a cable (or wire), such as disclosed in U.S. Pat. No. 7,172, 218 to Nakano et al. (incorporated by reference herein), were used as the linking member to push the seat supporting member rearward to displace the seat system the linking member would buckle. However, as disclosed herein, when a cable is used as the linking member the cable is tensioned and is configured to pull the seat supporting member in the rearward direction. In other embodiments, the occupant safety mechanisms disclosed herein may be configured to push the seat supporting member in the rearward direction, such as by utilizing a rod as the linking member.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these tee ins should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the occupant safety mechanisms as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. An occupant safety system for protecting the occupant of a vehicle seat, the system comprising:
   an adjuster mechanism configured to provide positional adjustment of the vehicle seat, the adjuster mechanism including an upper rail coupled to the vehicle seat and a lower rail configured to move relative to the upper rail;
   a movable seat supporting member located under the vehicle seat, the supporting member being operatively connected to the lower rail so that the vehicle seat moves with the supporting member; and
   a driving member connected to the supporting member by an elongated linking member;
   wherein the driving member includes a movable actuator connected to the linking member;
   wherein the driving member is configured to drive the actuator in a rearward direction causing a corresponding substantially linear rearward movement of the linking member, wherein movement of the linking member in the rearward direction pulls the supporting member and the vehicle seat including a seat back and a seat bottom in the substantially linear rearward direction.

2. The occupant safety system of claim 1, further comprising a base member configured to connect to the vehicle.

3. The occupant safety system of claim 2, wherein the driving member includes a housing configured to connect to the base member.

4. The occupant safety system of claim 2, wherein the supporting member is configured to slideably couple to the base member, such that movement of the supporting member is relative to the base member.

5. The occupant safety system of claim 4, further comprising a friction reducing device provided between the base member and the supporting member.

6. The occupant safety system of claim 1, wherein the drive member further includes a travel stop to limit the distance of rearward movement by the actuator to a travel stop position.

7. The occupant safety system of claim 6, wherein the drive member further includes a lock device to lock the actuator at the travel stop position, preventing the actuator from being able to move forward.

8. A vehicle seating system comprising:
   a vehicle seat including a seat bottom and a seat back;
   a movable seat supporting member connected to the seat bottom so that the vehicle seat moves with the supporting member; and
   a driving member connected to the supporting member by an elongated linking member;
   wherein the driving member includes a movable actuator connected to the linking member;
   wherein the driving member is configured to drive the actuator in a rearward direction causing a corresponding rearward movement of the linking member, wherein movement of the linking member in the rearward direction pulls the supporting member and vehicle seat in the rearward direction.

9. The vehicle seating system of claim 8, further comprising a seat belt webbing for restraining an occupant of the seat; wherein the driving member is configured to pretension the webbing.

10. The vehicle seating system of claim 9, further comprising a second linking member operatively connected to the actuator and the webbing.

11. The occupant safety system of claim 8, further comprising a base member configured to connect to the vehicle.

12. The occupant safety system of claim 11, wherein the driving member includes a housing configured to connect to the base member.

13. The occupant safety system of claim 11, wherein the supporting member is configured to slideably couple to the base member, such that movement of the supporting member is relative to the base member.

14. The occupant safety system of claim 13, further comprising a friction reducing device provided between the base member and the supporting member.

15. The occupant safety system of claim 8, wherein the drive member further includes a travel stop to limit the distance of rearward movement by the actuator to a travel stop position.

16. The occupant safety system of claim 15, wherein the drive member further includes a lock device to lock the actuator at the travel stop position, preventing the actuator from being able to move forward.

17. The occupant safety system of claim 8, further comprising an intervening member provided between the seat bottom and the moveable seat supporting member, wherein the intervening member is configured to move with the seat supporting member.

18. A vehicle seating system comprising:
a vehicle seat including a seat bottom and a seat back;
an adjuster mechanism coupled to the seat bottom for providing positional adjustment of the vehicle seat;
a movable seat supporting member connected to the adjuster mechanism so that the vehicle seat moves with the supporting member; and
a driving member connected to the supporting member by an elongated linking member;
wherein the driving member includes a movable actuator connected to the linking member;
wherein the driving member is configured to drive the actuator in a rearward direction causing a corresponding rearward movement of the linking member, wherein movement of the linking member in the rearward direction pulls the supporting member and vehicle seat in the rearward direction.

19. The vehicle seating system of claim 18, further comprising a seat belt webbing for restraining an occupant of the seat; wherein the driving member is configured to pretension the webbing.

20. The vehicle seating system of claim 19, further comprising a second linking member operatively connected to the actuator and the webbing.

* * * * *